April 21, 1953     A. P. SMITH     2,635,650
MANUALLY-PORTABLE CIRCULAR SAW
Filed Nov. 10, 1948     2 SHEETS—SHEET 2
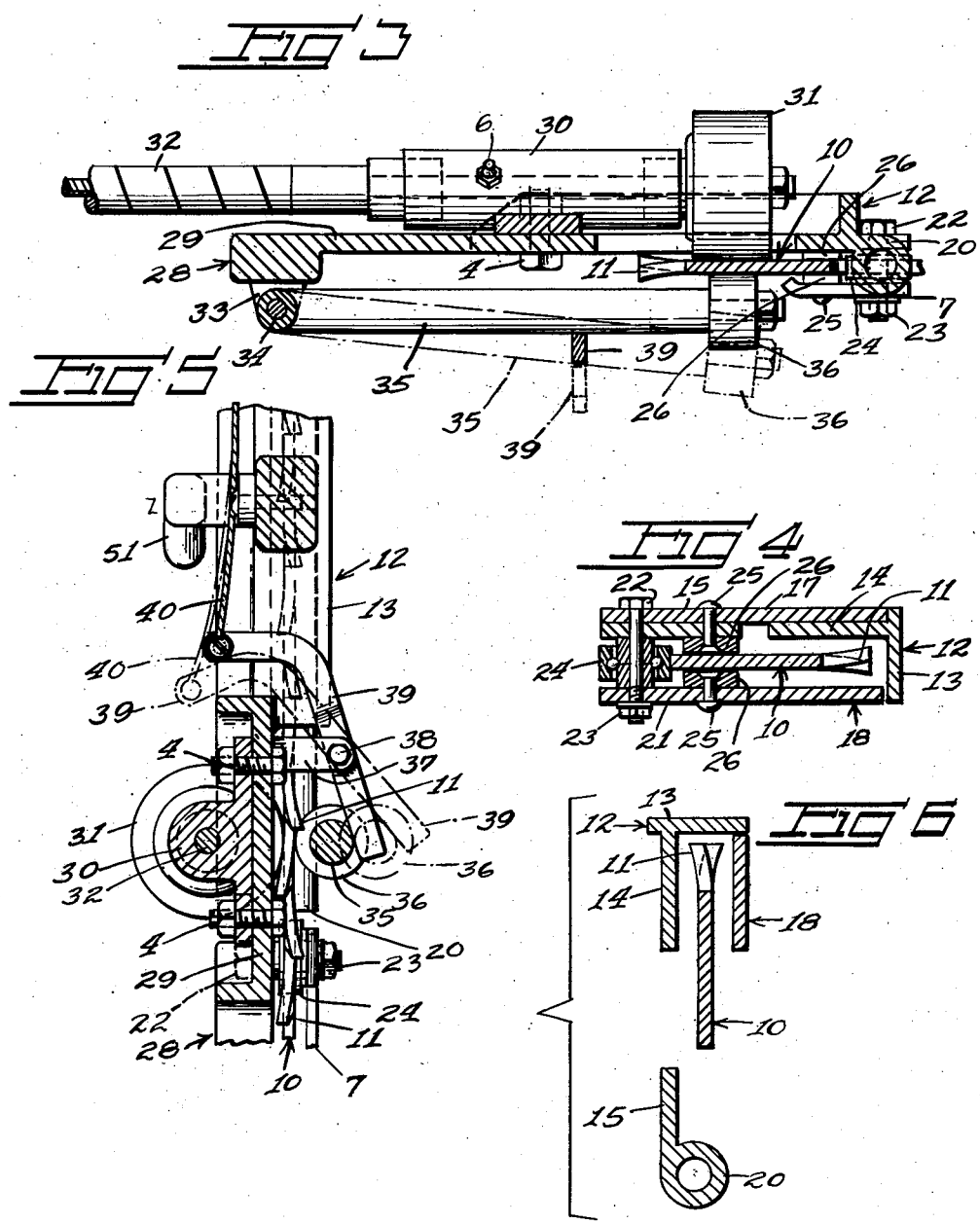
INVENTOR.
Albert P. Smith
BY Wilfred E. Lawson
Attorney Patented Apr. 21, 1953

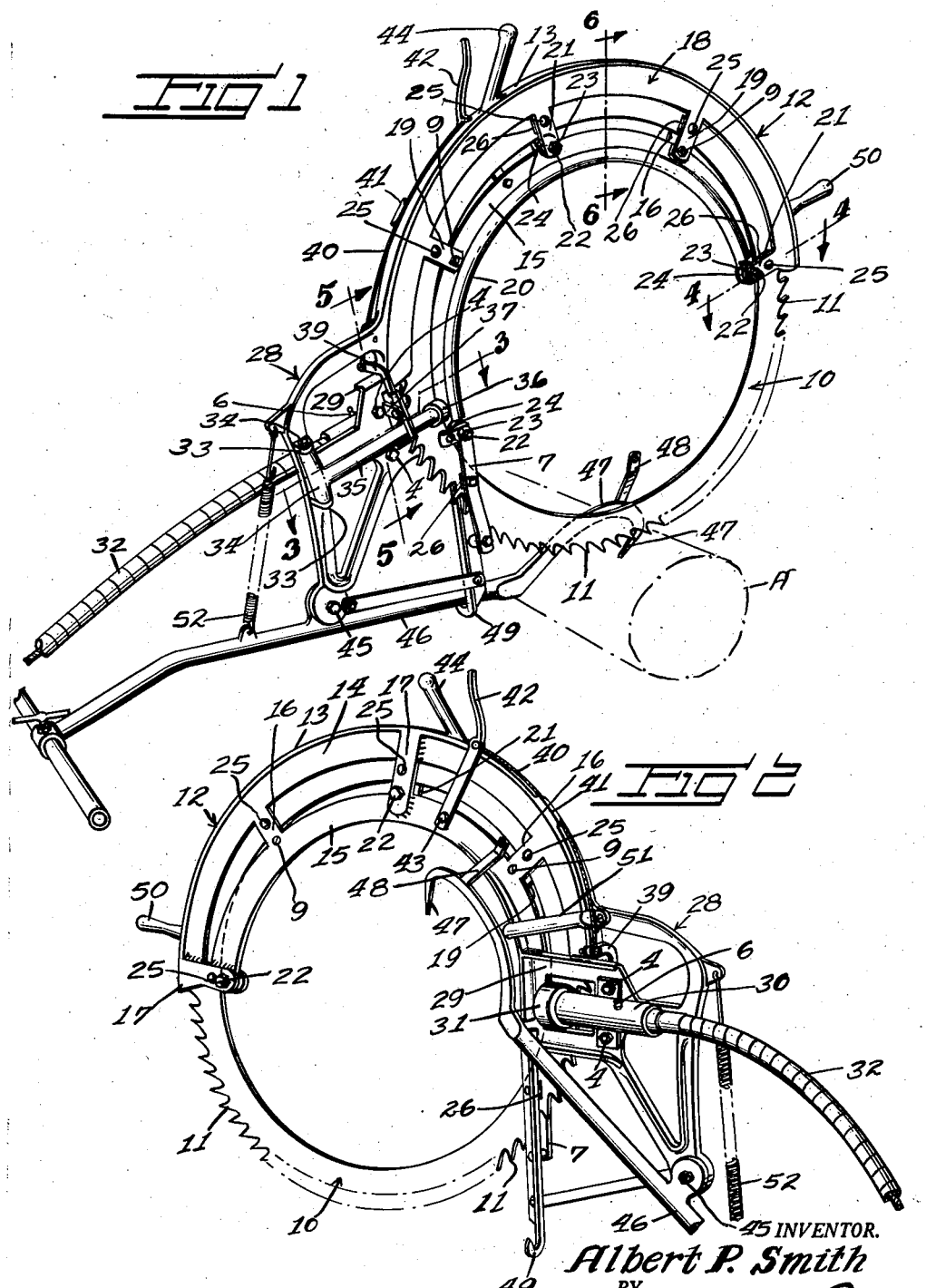

2,635,650

UNITED STATES PATENT OFFICE 2,635,650

MANUALLY-PORTABLE CIRCULAR SAW

Albert P. Smith, Ava, Mo., assignor, by mesne assignments, to Barker Saw Company, Springfield, Mo., a corporation of Missouri Application November 10, 1948, Serial No. 59,280

12 Claims. (Cl. 143—44)

This invention relates to a saw, and more particularly to a manually-portable circular saw.

The object of the invention is to provide a circular saw which is power operated, is portable, and which is particularly adapted for cutting trees or logs.

Another object of the invention is to provide a power-operated circular saw having structural features which render it readily adjustable, easy moving, and positive in operation to adapt the same to work of different kinds.

Still another object of the invention is to provide a portable saw embodying an annular saw, a power-driven friction-driving mechanism for rotating the circular saw at high speed, and a manually-operable means for controlling the rotation of the annular saw by the driving mechanism.

A further object of the invention is to provide a manually-portable circular saw which is extremely simple and inexpensive to manufacture.

Other objects and advantages will be apparent during the course of the following description.

In the accompanying drawings forming a part of this application, and in which like numerals are employed to designate like parts throughout the same, Figure 1 is a perspective view showing one side of the saw, and illustrating the use of the same, according to the present invention;

Figure 2 is a perspective view of the saw showing the opposite side thereof;

Figure 3 is an enlarged sectional view taken on the line 3—3 of Figure 1;

Figure 4 is an enlarged sectional view on the line 4—4 of Figure 1;

Figure 5 is an enlarged sectional view taken on the line 5—5 of Figure 1;

Figure 6 is an enlarged sectional view taken on the line 6—6 of Figure 1.

Referring in detail to the drawings, the numeral 10 designates an annular saw provided with a plurality of spaced, cutting teeth 11 on its outer periphery. A portion of the saw 10 is enclosed and rotatably supported in an arcuate semicircular housing 12 which serves to protect the user from the rotating saw 10. The housing 12 is preferably fabricated of suitable metal and comprises an outer casing 13 provided with an arcuate flange 14 on one side thereof, Figures 2 and 4. Arranged in spaced relation inwardly of the flange 14 is an inner support member 15 having its ends terminating on opposite sides of the saw 10. A plurality of radially-disposed strips 16 extend between the support member 15 and flange 14 for maintaining the parts in assembled relation. Secured to the exterior surface of the support member 15 and flange 14, as by welding, is a plurality of spaced, radially-disposed straps 17 for a purpose to be later described. Arranged in spaced, parallel, relation with respect to the flange 14 is a removable arcuate plate 18 having a plurality of radial strips 19, Figure 1, extending therefrom, there being a bolt-and-nut assembly 9 for releasably securing the strips 19 to the flat portion of the support member 15. The support member 15 has its inner position enlarged as at 20 for reinforcing or strengthening the latter.

Projecting downwardly, or formed integral with plate 18 is a plurality of strips 21 which are arranged in opposed, aligned relation with respect to the straps 17. Extending between the pairs of strips 17 is a bolt 22 having a castle nut 23 threaded on an end thereof. The bolts 22 each rotatably supports a roller bearing 24 which is in engagement with the inner edge of the saw 10 for rotatably supporting the latter. Arranged adjacent the bolts 22 and 9 and secured to the corresponding straps are rivets 25 which each supports a small fiber disc 26, Figure 4, for guiding the saw 10 in the housing 12.

Projecting from one end of the housing 12, or formed integral therewith, is a substantially V-shaped frame 28. Arranged on one side of the frame 28 and secured thereto is a plate member 29. A hollow casing 30 is secured to the plate member 29 by bolts 4 and rotatably supports a drive roller 31 which is arranged in frictional engagement with the side or face of the annular saw 10 for rotating the latter. A flexible cable 32 connects the roller 31 to a source of power. A suitable lubricant fitting 6 is carried by the housing to facilitate feeding lubricant to the cable bearing (not shown) within the housing.

Arranged on the other side of the frame 28 and projecting therefrom are a pair of spaced, apertured lugs 33 and a pin 34 extends therebetween for pivotally supporting a T-shaped crank or bar 35. The free end of the bar 35 carries a rotatable collar 36 which is adapted to be moved into and out of contact with the saw 10 for selectively causing the roller 31 to rotate the saw 10.

For causing pivotal movement of the bar 35, a manually-operable means is provided and comprises a lug 37 which is secured to the frame 28. A pin 38, Figure 5, pivotally supports a link 39 on the lug 37, and one end of the link 39 is arranged in engagement with the bar 35. Connected to the other end of the link 39 is a cable 40 which is trained under a guide member 41 and is connected to an actuating lever 42. The lever 42 is pivotally connected to the support member 15, as at 43, Figure 2. A handle 44 projects outwardly from the casing 13 so that the user can manually move the lever 42 toward the handle 44 to pivot the bar 35, thus moving the roller 36 against the saw 10 so that the saw will be positively driven by the friction roller 31. A rod 7 carrying a roller bearing 24 projects from the frame 28 for additionally guiding and supporting the saw 10.

Pivotally connected to the frame 28 by a pin 45 is a support arm 46 and the arm 46 terminates in a log-engaging hook 47. A spring metal finger 48 projects from the support arm 46 and is adapted to engage the housing 12 in order to releasably maintain the arm 46 in its raised position, Figure 2. The frame 28 dependingly carries a hook 49 for engagement with the support arm 46 to limit downward movement of the latter. A coil spring 52 connects the frame 28 to the arm 46 for urging the hook into engagement with the log to be sawed.

Projecting from one end of the housing 12 is a first handle 50, there being a second handle 51, Figure 2, arranged adjacent the other end of the housing 12 whereby the entire saw assembly can be moved as desired.

In use, the device is arranged so that the circular saw 10 is in engagement with the log A or other timber to be cut. Then the friction roller 31 is electrically actuated. The saw 10 will not rotate, however, until the lever 42 is moved toward the handle 44. Moving the lever 42 causes the link 39 to pivot to thereby move the bar 35 and cause the roller 36 to be moved from its dotted line position of Figures 3 and 5 to the solid line so that it forces the saw 10 against the rotating roller 31 to thereby rotate the saw 10. When the lever 42 is released, the saw 10 will stop rotating.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a circular saw, an arcuate housing, an annular saw provided with a plurality of cutting teeth on its outer periphery rotatably supported by said housing, a frame secured to one end of said housing, a plate member arranged on one side of said frame and secured thereto, a driving roller supported by said plate member and frictionally engaging said annular saw, a bar arranged on the other side of said frame and having one end pivotally connected thereto, a roller rotatably mounted on the other end of said bar and mounted for movement into and out of frictional engagement with said saw upon pivotal movement of said bar, manually-operable means for causing pivotal movement of said bar, a support arm pivotally connected to one end of said frame, and a log-engaging hook arranged on one end of said arm for steadying said saw during use.

2. In a circular saw, an arcuate housing, an annular saw provided with a plurality of cutting teeth on its outer periphery rotatably supported by said housing, a frame secured to one end of said housing, a plate member arranged on one side of said frame and secured thereto, a driving roller supported by said plate member and frictionally engaging said annular saw, a bar arranged on the other side of said frame and having one end pivotally connected thereto, a roller rotatably mounted on the other end of said bar and mounted for movement into and out of frictional engagement with said saw upon pivotal movement of said bar, manually-operable means for causing pivotal movement of said bar, a support arm pivotally connected to one end of said frame, a log-engaging hook arranged on one end of said arm for steadying said saw during use, and a spring finger secured to said support arm for engagement with said housing to hold said support arm immobile, in its raised position.

3. In a circular saw, an arcuate housing, an annular saw provided with a plurality of cutting teeth on its outer periphery rotatably supported by said housing, a frame secured to one end of said housing, a plate member arranged on one side of said housing and secured thereto, a driving roller supported by said plate member and frictionally engaging said annular saw, a bar arranged on the other side of said frame and having one end pivotally connected thereto, a roller rotatably mounted on the other end of said bar and mounted for movement into and out of frictional engagement with said saw upon pivotal movement of said bar, manually-operabe means for causing pivotal movement of said bar, a support arm pivotally connected to one end of said frame, a log-engaging hook arranged on one end of said arm for steadying said saw during use, a spring finger secured to said support arm for engagement with said housing to hold said support arm immobile in its raised position, and a hook dependingly carried by said frame for engagement with said support arm to limit downward movement of the latter.

4. In a portable power-driven circular saw, a housing, an annular saw rotatably supported by said housing, electrically-driven means continuously operable for rotating said saw including a smooth friction roller engaging said saw, and manually-operable means varying the pressure between said friction roller and said saw for controlling the rotation of said saw by said electrically-driven means.

5. In a circular saw, an arcuate housing comprising a saw guard, an annular saw having cutting teeth on its outer periphery and rotatably supported by said housing, a plate member supported by said housing, a driving roller journaled on said plate for rotation about a stationary axis and engaging one side of said saw, a bar pivoted upon said plate upon the other side of said saw for movement towards and from said saw and an idler roller rotatable on said bar and engaging the other side of said saw, means controllably pressing said idler roller against said saw to vary the frictional driving engagement of the driving roller against the saw.

6. The combination of claim 5 wherein said bar comprises a T-shaped member whose head end is pivoted upon said plate, said idler roller being journaled upon the end of the T-shaped member opposite the headed end.

7. The combination of claim 5 wherein said plate member is provided with an aperture, said driving roller extending through said aperture for engagement with said saw.

8. In a circular saw, an arcuate housing comprising a saw guard, an annular saw having cutting teeth on its outer periphery and rotatably supported by said housing, means for rotating said annular saw, said housing including a cylindrical outer casing partially surrounding and enclosing the saw teeth, an annular inwardly extending flange on said outer casing, an inner arcuate support member disposed in adjacent, spaced relation and rigidly connected to said flange, a removable arcuate plate disposed parallel to and mounted upon said arcuate support member for housing said annular saw therebetween.

9. The combination of claim 8 including fastening members extending between said removable plate and said arcuate support, rollers journaled on said fastening members and rotatably supporting said annular saw.

10. The combination of claim 8 including saw guide members secured to the adjacent surfaces of said arcuate support member and said arcuate plate for frictionally engaging opposite sides of said annular saw.

11. A combination of claim 8 including straps rigidly connecting said arcuate flange and said arcuate support member, 12. The combination of claim 8 including straps rigidly connecting said arcuate flange and said arcuate support member, strips connected to said arcuate flanges and to said arcuate support member in parallel relation to said straps, saw guide members engaging opposite sides of said annular saw and carried by said straps and strips.

ALBERT P. SMITH.

References Cited in the file of this patent

UNITED STATES PATENTS

| Number | Name | Date |
| --- | --- | --- |
| 294,221 | Gorrell et al. | Feb. 26, 1884 |
| 1,388,186 | McCormick | Aug. 23, 1921 |
| 1,395,100 | Fite | Oct. 25, 1921 |
| 1,395,101 | Fite | Oct. 25, 1921 |
| 2,490,255 | Chase | Dec. 6, 1949 |

FOREIGN PATENTS

| Number | Country | Date |
| --- | --- | --- |
| 64,034 | Austria | Mar. 26, 1914 |
| 70,233 | Sweden | Sept. 16, 1930 |